(12) United States Patent
Cist

(10) Patent No.: US 6,940,446 B2
(45) Date of Patent: Sep. 6, 2005

(54) SYSTEM AND METHODS FOR OBTAINING GROUND CONDUCTIVITY INFORMATION USING GPR DATA

(76) Inventor: David B. Cist, 21 Dennet Rd., Winchester, MA (US) 01890

( * ) Notice: Subject to any disclaimer, the term of this patent is extended or adjusted under 35 U.S.C. 154(b) by 0 days.

(21) Appl. No.: 10/681,543

(22) Filed: Oct. 8, 2003

(65) Prior Publication Data

US 2005/0078028 A1    Apr. 14, 2005

(51) Int. Cl.$^7$ .................... G01S 13/88; G01S 13/00
(52) U.S. Cl. .................... 342/22; 342/175; 342/195; 324/629; 324/637
(58) Field of Search .................... 342/21, 22, 27, 342/28, 59, 165, 173–175, 188–197; 324/600, 324/602, 605–611, 615–724

(56) References Cited

U.S. PATENT DOCUMENTS

| | | | | |
|---|---|---|---|---|
| 2,575,340 A | * | 11/1951 | Goldstein | 342/22 |
| 3,562,642 A | * | 2/1971 | Hochschild | 324/642 |
| 3,665,466 A | * | 5/1972 | Hibbard | 342/59 |
| 4,507,602 A | * | 3/1985 | Aguirre | 324/638 |
| 5,012,248 A | * | 4/1991 | Munro et al. | 342/22 |
| 5,420,589 A | * | 5/1995 | Wells et al. | 342/22 |
| 6,163,292 A | * | 12/2000 | Liedtke et al. | 342/22 |
| 6,246,354 B1 | * | 6/2001 | Liedtke et al. | 342/22 |
| 6,377,201 B1 | * | 4/2002 | Chu | 342/22 |
| 6,477,474 B2 | * | 11/2002 | Diede | 324/642 |
| 6,545,945 B2 | * | 4/2003 | Caulfield | 342/22 |

* cited by examiner

Primary Examiner—Bernarr E. Gregory
(74) Attorney, Agent, or Firm—Lowrie, Lando & Anastasi, LLP (57) ABSTRACT

A method for inferring information about the conductivity of a medium from ground penetrating radar (GPR) data using a calculated effective penetration limit of the GPR system, including various methods for calculating the effective penetration limit.

21 Claims, 8 Drawing Sheets

SYSTEM AND METHODS FOR OBTAINING GROUND CONDUCTIVITY INFORMATION USING GPR DATA

BACKGROUND OF INVENTION

1. Field of Invention

The present invention is directed toward a system and methods for obtaining ground conductivity information by determining an effective penetration limit of a ground penetrating radar system and associating this limit with relative ground conductivity.

2. Discussion of Related Art

Ground penetrating radar ("GPR") systems are used to obtain measurements of subsurface structures and provide images of the internal structure of optically opaque media/materials such as soil, rock, concrete, asphalt and wood. Many GPR systems operate by radiating pulsed radio waves in the range of about 1 to 2000 megahertz (MHz) that depolarize bound electrons in the media in a way that propagates the signal through the media. The radiated pulses propagate from the system's transmitting antenna, penetrate a subsurface medium, and reflect, refract, and/or diffract at boundaries of intrinsic impedance contrasts, commonly referred to as targets, in the subsurface medium. A portion of the redirected energy propagates back to a receiving antenna, where the energy may be processed, displayed and stored. Most GPR equipment utilizes time-domain methods to process the data to construct a time versus distance profile of a series of measurements over the medium surface to provide a cross-sectional image of targets within the medium. Collecting several adjacent profile lines produces data that can be used to provide a 3-D map of the surveyed region.

A less common GPR technique utilizes stepped continuous-wave technology, which entails radiating short pulses at different frequencies. Another less commonly used GPR technique employs a continuously radiated pulse swept over a range of frequencies. The data obtained using both these methods can be converted into the equivalent time-distance map produced by time-domain GPR systems by using inverse Fourier transforms performed on each scan.

The effective penetration limit of GPR system in a medium (i.e., the maximum depth below the surface of the medium at which the GPR system can provide good data) may be constrained by electrical properties of the medium, such as, for example, the conductivity of the medium. Soil conductivities may vary significantly due to two main factors: (1) mineralogic changes, and (2) changes in the fluid composition and concentration in pores of the soil. For example, mineralogic clay, may limit the effective penetration limit of a 400 MHz center frequency GPR antenna to as little as 1 meter, whereas slightly moist sand may yield a effective penetration limit of up to 50 meters or more for a similar GPR antenna.

During the setup phase of a typical GPR survey, an operator adjusts a number of settings on the GPR control unit such as the time range, number and type of filters, and gain of the system. These settings affect the GPR data quality and may be directly influenced by the conductivity of the ground. The current approach for adjusting the settings of the GPR unit require the user to collect several test passes by moving the GPR antenna over the data collection site, visually examine the data, and then manually adjust the settings and repeat the procedure until a desirable setup is obtained. This procedure may be time-consuming and prone to operator error. In addition, in some cases, the ground conductivity may change significantly over some sections of the survey area resulting in high quality GPR data in some portions of the area and poor GPR data in others.

Variations in soil conductivity that affect GPR signal strength and the associated effective penetration limit of the GPR system can sometimes be detected and mapped using other non-invasive remote sensing techniques. For example, low-frequency electromagnetic induction (EMI) techniques are commonly used to map conductivity changes in the ground. These techniques have a number of limitations such as, for example, they have poor vertical resolution, they are very sensitive to external clutter, such as cars and atmospheric disturbances, and EMI measurements typically must be corrected for time drift.

SUMMARY OF INVENTION

For the reasons discussed above, a need exists for a reliable and efficient method to automatically adjust the data collection parameters after collecting a test profile and preferably to dynamically adjust them depending on the ground electrical properties during actual data collection. The desired method may preferably obtain a measure of ground conductivity from the GPR data in real time.

There is also a need for mapping subsurface conductivity variations using a technique that is insensitive to above-ground objects, is stable, is repeatable, and has significant vertical resolution. Such a technique would be valuable in locating local conductivity changes associated with, for example, leaking gas or other fuels from buried pipe lines, moisture variations in soil, and mineralogic changes in the ground.

In addition, there is a substantial need for a method for extracting ground conductivity information from GPR data. Such a method would be very desirable for mapping spatial variations in ground conductivity. The method would also be useful if it could be automated for the purpose of adjusting the GPR data collection parameters in real time.

According to one embodiment, a method of obtaining information about electrical properties of a medium comprises steps of scanning the medium with a ground penetrating radar (GPR) system to collect at least one scan of GPR data about the medium, determining an effective penetration limit of the GPR system into the medium based at least in part on the GPR data collected, and obtaining the information about the conductivity of the medium based at least in part on the effective penetration limit.

In one example, determining the effective penetration limit comprises steps of dividing the at least one scan of GPR data into a plurality of segments, each segment corresponding to a scan (time) interval, summing a number of inflection points present in each segment to provide a plurality of summed values, one summed value corresponding to each segment, comparing the plurality of summed values, selecting one of the plurality of summed values that is significantly larger than any of the plurality of summed values corresponding to earlier scan (time) intervals, to provide a selected summed value, and selecting a time point in the segment corresponding to the selected summed value as the effective penetration limit of the GPR system.

In another example, obtaining the information about the electrical properties of the medium comprises steps of repeating the steps of scanning the medium and determining the effective penetration limit to obtain a plurality of effective penetration limits corresponding to a plurality of scans of GPR data, recording a location in the medium of each of the plurality of effective penetration limits, and assembling the plurality of effective penetration limits and associated locations to create a profile of conductivity values of the medium.

According to another example, the step of scanning the medium is repeated at regularly spaced intervals to obtain a plurality of substantially parallel, regularly spaced, profile lines of GPR data. The method may further comprise a step of combining the plurality of profile lines of GPR data to create a relative conductivity contour map that represents spatial relative conductivity variations of a scanned area of the medium.

In one example, the spatial relative conductivity variations of the scanned area of the medium may be used to locate a target within the medium, such as, for example, a leaking pipe. In another example, the method includes repeating the steps of scanning the medium at regularly spaced intervals, at a later time, to obtain a second plurality of substantially parallel, regularly spaced profile lines of GPR data. The method may further comprise a step of combining the second plurality of profile lines of GPR data to create a second conductivity contour map that represents spatial relative conductivity variations of the scanned area of the medium at the later time. The method may further comprise a step of determining temporal relative conductivity variation in the scanned area by subtracting values of the second conductivity map from corresponding values of the first conductivity map.

According to another embodiment, determining the effective penetration limit comprises steps of dividing the at least one scan of GPR data into a plurality of segments, each segment corresponding to a scan (time) interval, summing a number of amplitude changes from a positive value to a negative value and from a negative value to a positive value within each segment, to provide a plurality of summed values, each of the plurality of summed values corresponding to one of the plurality of segments. The method further includes then comparing the plurality of summed values, selecting one of the summed values that is significantly larger than any of the summed values corresponding to segments associated with earlier scan (time) intervals, to provide a selected summed value, and then selecting as the effective penetration limit, a point in time in the segment corresponding to the selected summed value.

In another embodiment, the step of determining the effective penetration limit comprises steps of dividing the at least one scan of GPR data into a plurality of segments, each segment corresponding to a scan (time) interval, converting each of the plurality of segments into a corresponding plurality of blocks of frequency domain data, determining a bandwidth of each of the plurality of blocks of frequency domain data, selecting one of the plurality of blocks of frequency domain data that has a larger bandwidth than any of the plurality of blocks of frequency domain data corresponding to earlier scan (time) intervals, to provide a selected segment, and selecting as the effective penetration limit a time point within the selected segment.

According to yet another embodiment, a method of determining an effective penetration limit of a ground penetrating radar (GPR) system comprises steps of collecting a first scan of GPR data of a region of ground being surveyed, collecting a second scan of GRP data of the region of ground, converting the first scan of GPR data into a first data stream, wherein each data value of the first scan of GPR data having a positive amplitude is converted into a 1 and each data value of the first scan of GPR data having a negative amplitude is converted into a −1, such that the first data stream comprises a plurality of 1's and −1's forming a plurality of samples, and converting the second scan of GPR data into a second data stream, wherein each data value of the second scan of GPR data having a positive amplitude is converted into a 1 and each data value of the second scan of GPR data having a negative amplitude is converted into a −1, such that the second data stream comprises a plurality of 1's and −1's forming a plurality of samples. The method further comprises steps of multiplying the first data stream and the second data stream together, sample by sample, to create a resultant scan, dividing the resultant scan into a plurality of segments, each segment corresponding to a scan (time) interval in each of the first and second scans, summing the samples present in each segment of the resultant scan to provide a plurality of summed values each corresponding to one of the plurality of segments, selecting a summed value that corresponds to a significant increase relative to the summed values from segments associated with earlier scan (time) intervals, to provide a selected summed value, and determining the effective penetration limit of the GPR system as a depth based on a chosen point in time within the segment corresponding to the selected summed value.

According to a further embodiment, a GPR system for obtaining information about electrical properties of a medium includes a control unit configured to scan the medium using a GPR antenna coupled to the GPR system, to collect at least one scan of GPR data about the medium, determine an effective penetration limit of the GPR system into the medium based at least in part on the GPR data collected, and obtain the information about the electrical properties of the medium based at least in part on the effective penetration limit. In one example, the control unit may be configured to determine the effective penetration limit of the GPR system using any of the methods described above.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. In particular, the use of "including," "comprising," or "having," "containing", "involving", and variations thereof herein, is meant to encompass the items listed thereafter and equivalents thereof as well as additional items.

Figure 1:
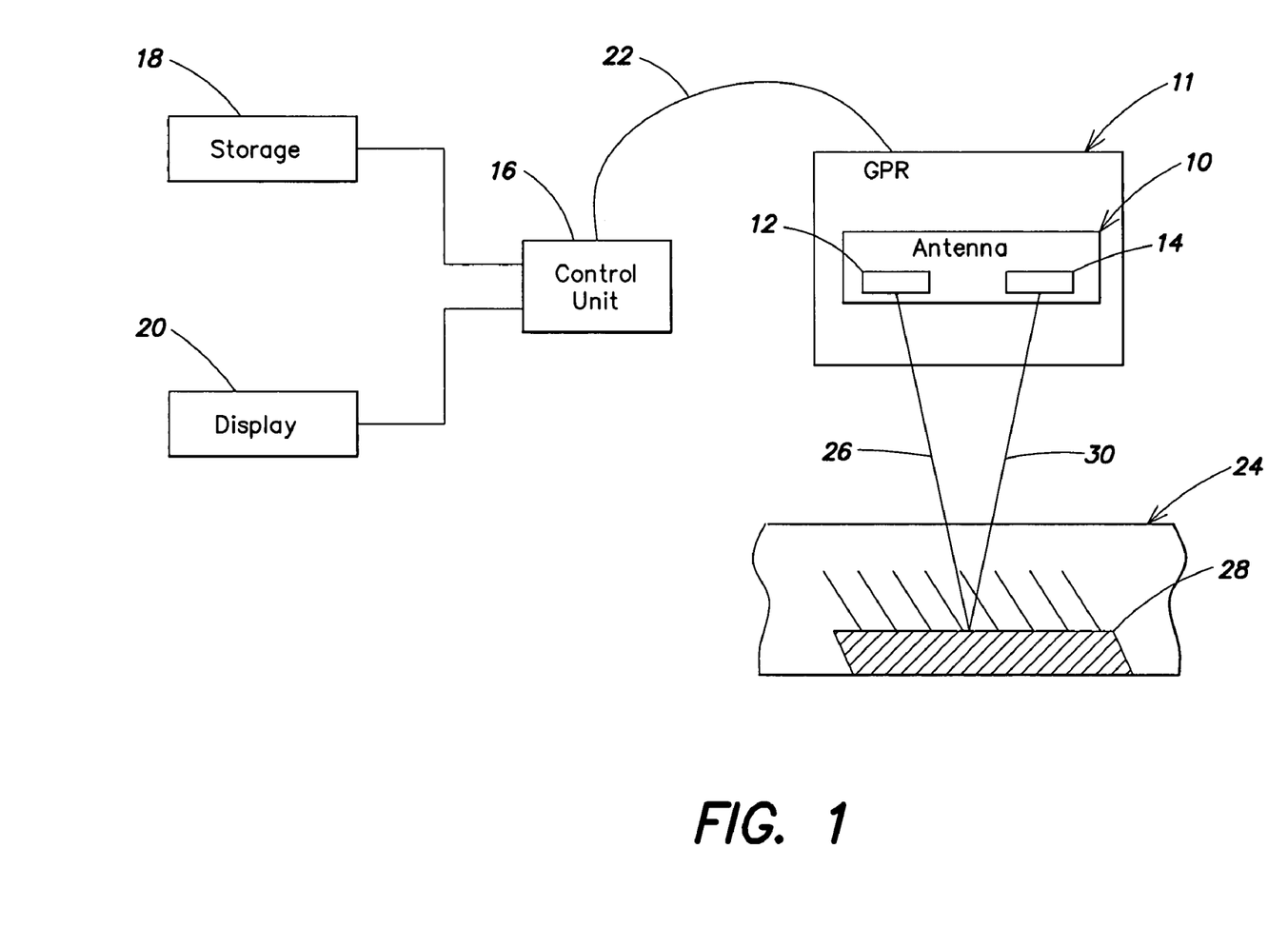
FIG. 1 is a block diagram of one example of a GPR system.

Referring to FIG. 1, there is illustrated one embodiment of a typical ground penetrating radar (GPR) system. The illustrated system comprises a transducer 10 including a transmitting antenna 12 and a receiving antenna 14. The transducer 10 is coupled to a control unit 16 which may send control signals, including a transmitter trigger pulse, to the transducer 10 and may receive signals from the transducer 10. Control unit 16 may be coupled to a storage device 18 and a display device 20. It is to be appreciated that while control unit 16, storage device 18 and display device 20 are illustrated as discrete units in this example, they may be provided as a single integrated element, such as, for example, a personal computer, or in some other arrangement.

The control unit 16 may be configured to generate a signal, typically a pulse signal, which is transported to the transducer module via, for example, a cable 22. The signal 26 may be transmitted by transmitting antenna 12, and penetrates a medium 24 where it may be reflected by a subsurface target 28. Target 28 may be any object that has an intrinsic impedance different from that of the surrounding medium, and which thus causes at least a partial reflection of a signal propagating through the medium. Some examples of targets include a metal object, a plastic pipe, a body of water, interface between two different soil types, etc. The reflected signal 30 propagates back from target 28, through medium 24, and may be received by receiving antenna 14. Control unit 16 may further be configured to receive the reflected signal 30 from transducer 10 via, for example, cable 22, and to store (using storage device 18) and/or display (using display device 20) information derived from the reflected signal 30 or characteristics of the reflected signal 30, such as, for example, amplitude, time duration, center frequency, or frequency distribution of the reflected signal. Control unit 16 may also be configured to derive information about target 28 from measured characteristics of reflected signal 30. It is to be appreciated that the above description relates to one example of a GPR system that may be used with the invention. However, the invention is not limited to the GPR system described in reference to FIG. 1, and any system and control unit know to one of skill in the art may be used to implement the invention, so long as it is configured as described herein.

Figure 2:
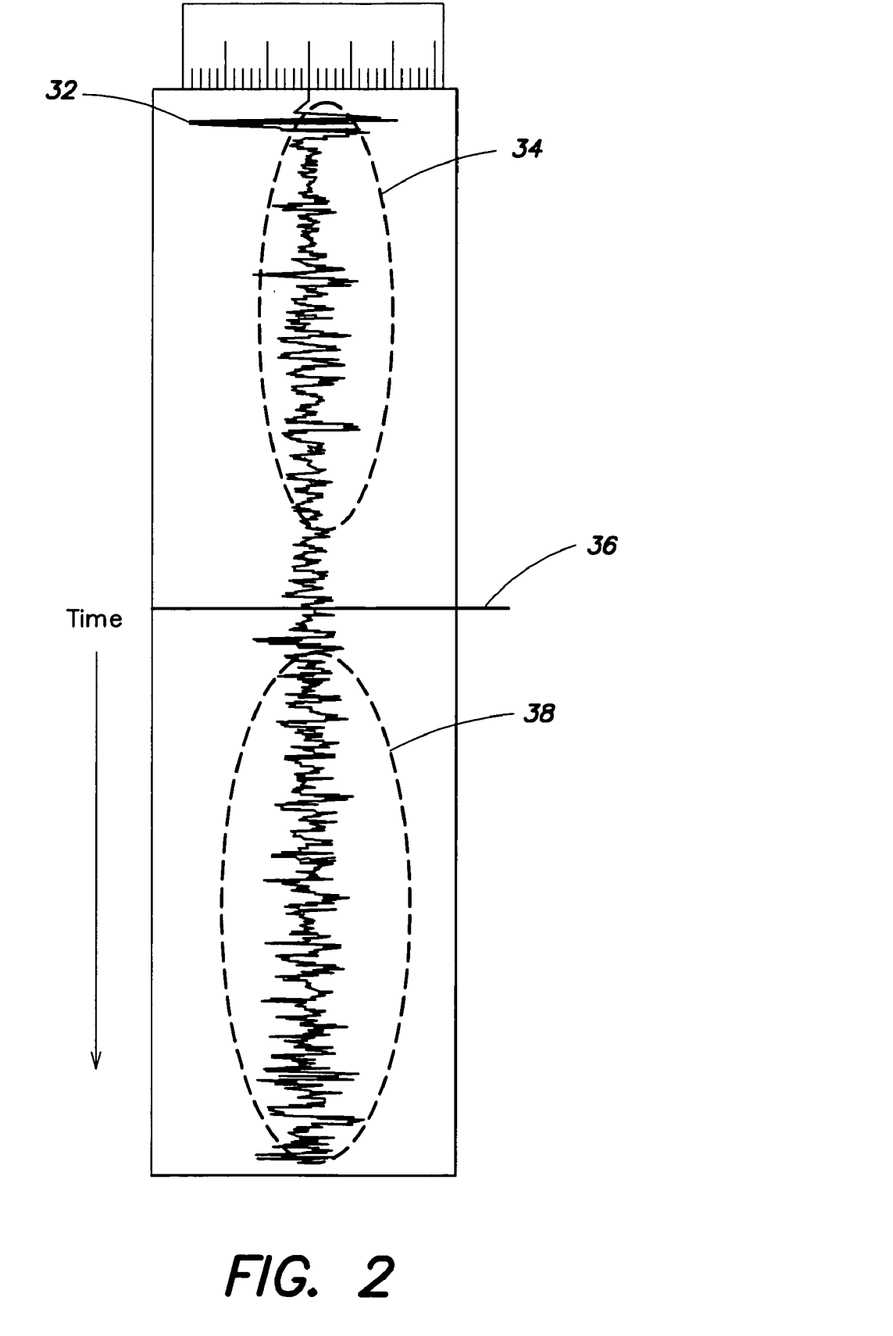
FIG. 2 is a depiction of one example of a typical GPR scan illustrating an effective penetration limit of the GPR system.

FIG. 2 illustrates one example of a scan of data 32 that may be collected and stored by a GPR system. The scan is a record of the reflected signal 30 arriving at the receive antenna 14 over a specified time interval. Reflected signals 34 arriving at the receive antenna 14 early in time may often be clearly defined because their amplitudes are significantly higher than ambient noise and GPR system noise levels. Reflected signals arriving at the receive antenna 14 later in time are progressively attenuated by a number of loss mechanisms, including attenuation due to the conductivity of the medium, spreading loss, and scattering loss. A maximum time, or penetration distance, range can often be observed in a GPR scan, that defines a boundary 36 between detectable reflections and later reflections 38 that cannot be accurately differentiated from the ambient and system noise. This boundary 36 may be referred to as the effective penetration limit of the GPR system.

Figure 3:
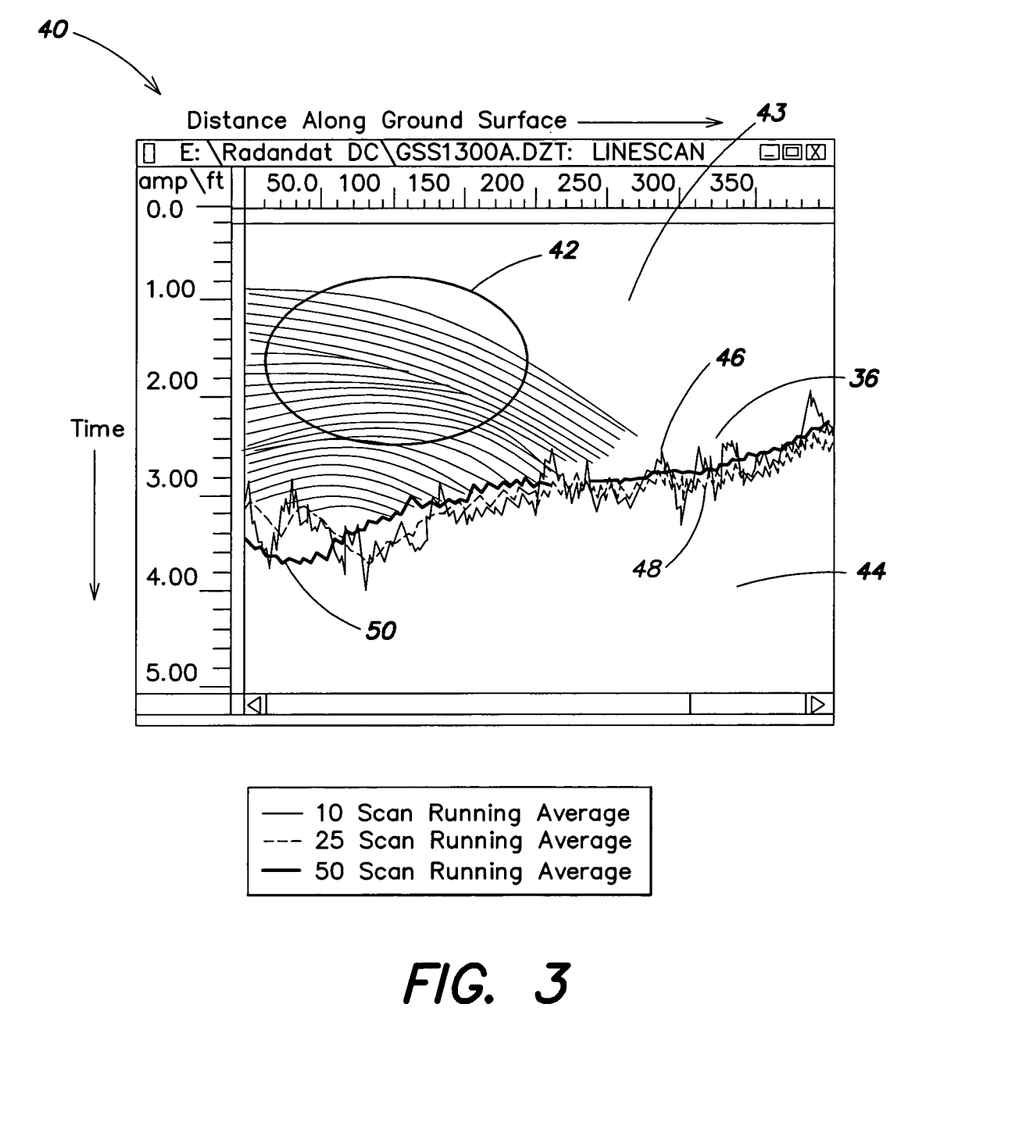
FIG. 3 is an example of a GPR image obtained from a plurality of series of scans and illustrating the effective penetration limit.

Referring to FIG. 3, there is illustrated an image 40 that may be obtained from a plurality of series of the GPR scans 32 of FIG. 2 taken at even increments along a ground surface. As shown in the illustrated example, coherent reflections that are above the effective penetration limit 36 may be continuous across a number of consecutive scans, providing continuous features 42 in the image 40. Below the effective penetration limit 36, for example, in region 44 of the image 40, it can be seen that there are no continuous features present. According to one embodiment, gradation from the portion of the scan dominated by coherent signal (region 43 in image 40) to the portion of the scan dominated by noise may be observed with the human eye on a typical GPR image, such as image 40. However, it may be desirable that the effective penetration limit be detected using an automated method.

The calculated effective penetration limit may vary significantly from scan to scan due to inherent inaccuracies in methods used to perform the effective penetration limit calculation. Therefore, in some applications, it may be preferred to use a running average of a number of consecutive effective penetration limit values calculated for consecutive scans, as will be discussed in more detail below. Such techniques may provide a more accurate estimate of the effective penetration limit of the GPR system. FIG. 3 shows three traces 46, 48, and 50 representing effective penetration limits obtained from a 10 scan running average (46), a 25 scan running average (48), and 50 scan running average (50), respectively.

Figure 5:
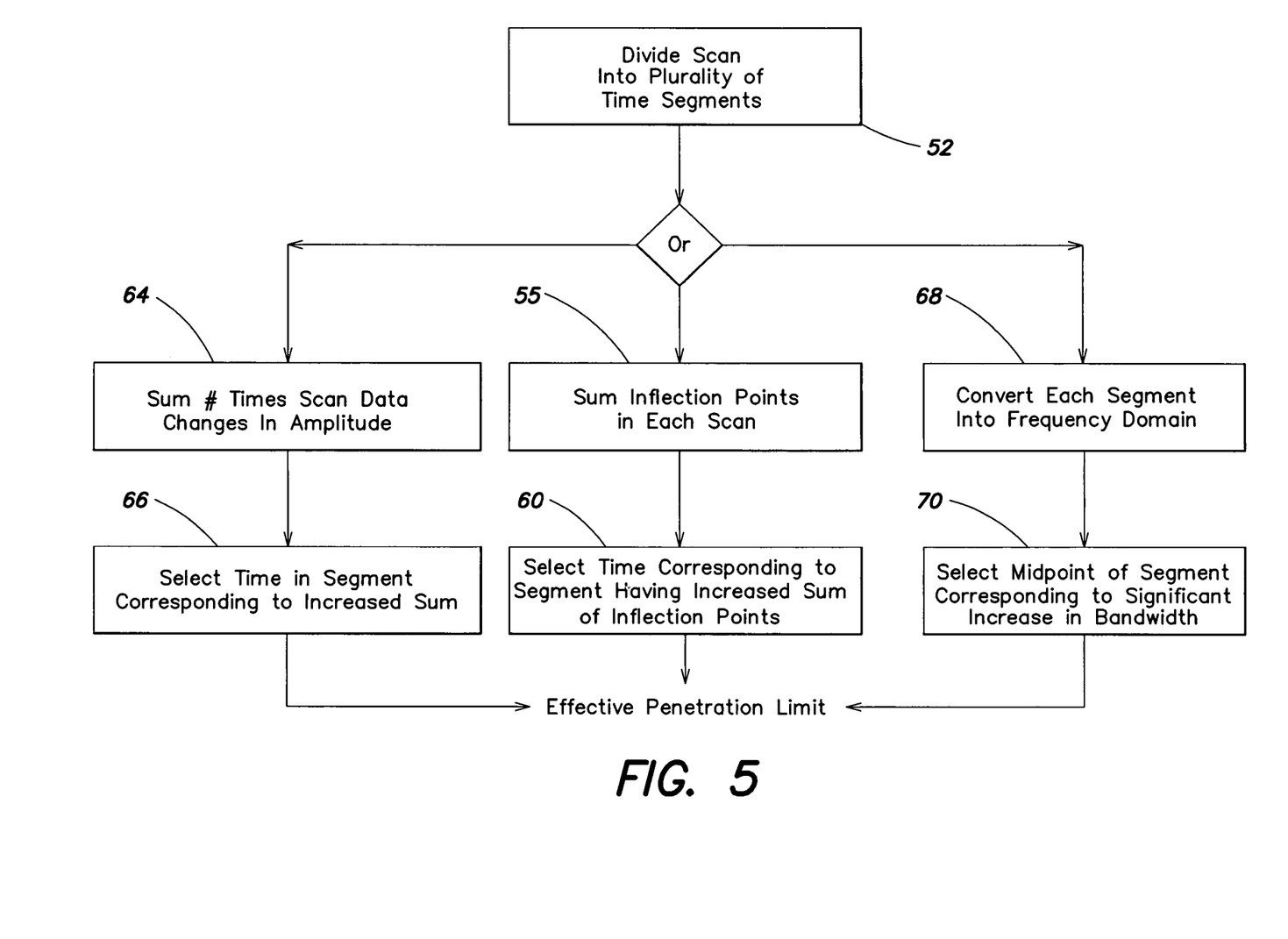
FIG. 5 is a flow diagram illustrating one embodiment of a method of effective penetration limit determination according to the invention.

There are a number of approaches for detecting the effective penetration limit of a GPR scan. Referring to FIG. 5, according to one embodiment, a method of automatically calculating the effective penetration limit of the GPR system may include, in a first step 52, dividing a scan of GPR data 32 into a number of equivalent time segments 54. In one example, the scan may be divided into ten segments, however it is to be appreciated that the invention is not so limited, and the scan may be divided into any number of segments. Next, in step 55, the number of inflection points 56 in each segment may be summed to provide a summed value 58. For the purposes of this specification, an inflection point 54 is defined to be a point in the scan where the sign (positive or negative) of a slope connecting adjacent data points changes. A time corresponding to the middle or end of a first segment that corresponds to a significant increase in inflection points compared to the summed values of earlier segments may be selected, in step 60, as the effective penetration limit 36 of the GPR system. It is to be appreciated that this method can be applied with some variation to obtain the same relative results. For example, a user may select any of the beginning, end or middle of the segment corresponding to the significant increase in inflection points to be the penetration limit. Which point is chosen will result in a different absolute penetration limit for each scan, but the change in penetration limit values from one scan to the next will be the same. Also, although the first segment corresponding to a significant increase in inflection points may often indicate the effective penetration limit of the GPR system, the invention is not so limited, and in some examples, a time corresponding to a second or later segment that also corresponds to a significant increase in inflection points may be selected as the effective penetration limit of the system.

Figure 4:
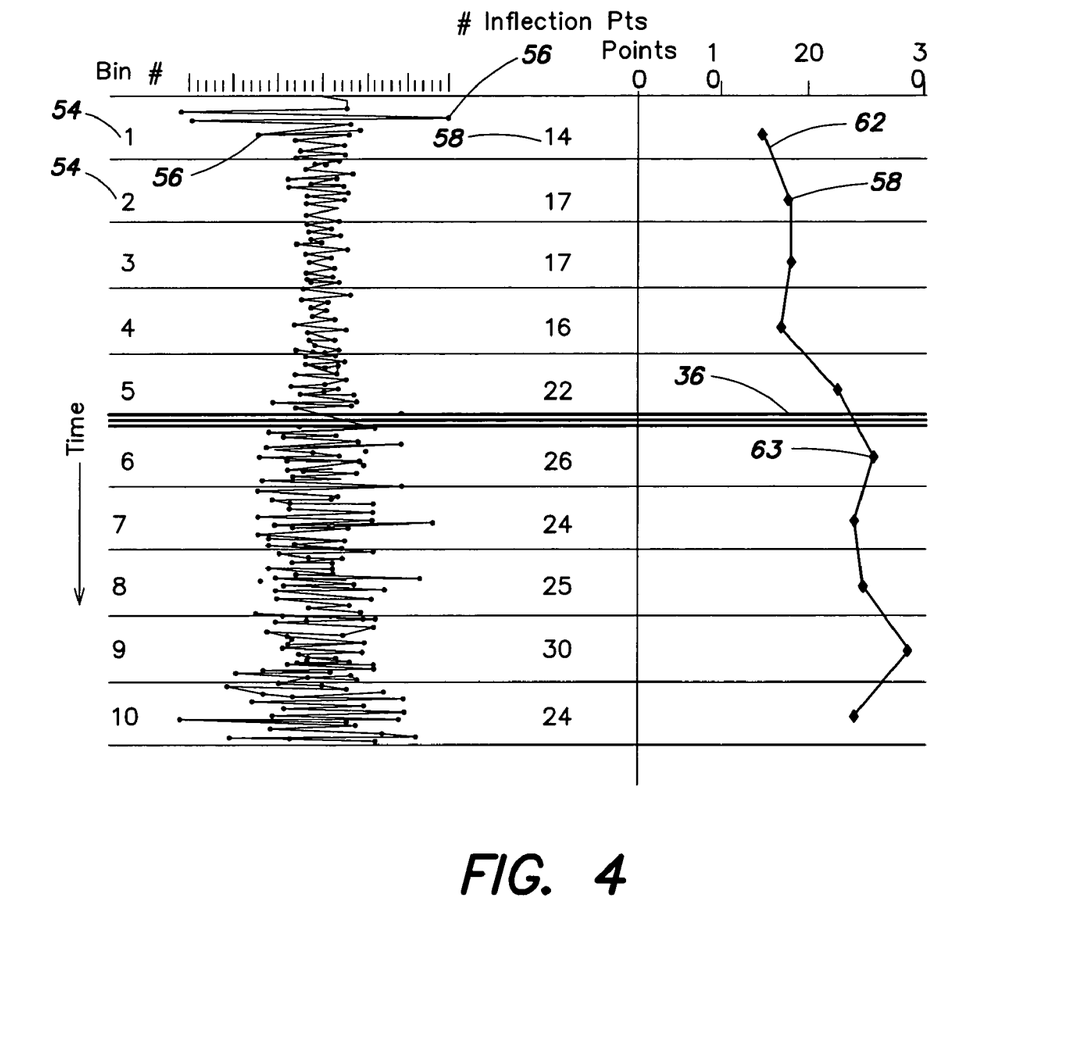
FIG. 4 is an illustration of an effective penetration limit determination process according to one embodiment of the invention.

As shown in FIG. 4, this method may produce a graph 62 of the summed values of inflection points (for each segment) versus time. A sharp increase in the summed values, for example, point 63 on the graph 62, may be selected as corresponding to the effective penetration limit of the system.

According to another embodiment, a method for determining the effective penetration limit may include the following steps, as shown in FIG. 5: In the first step 52, the scan may be divided into a number of equivalent time segments, as discussed above. Next, in step 64, the number of times the scan data values change amplitude from either a positive value to a negative value or a negative value to positive value in each segment may be summed to provide a summed total. The middle (or end) of a segment that corresponds to a significant increase in the summed total relative to the summed totals from the earlier time segments may be selected, in step 66, as the effective penetration limit of the GPR system.

According to another embodiment, an effective penetration limit determination method may include the following steps, as shown in FIG. 5: dividing the scan into a number of time segments (step 52), converting each segment into the frequency domain (step 68), and selecting (step 70) the midpoint of the segment that corresponds to a significant increase in frequency bandwidth relative to earlier time segments as the effective penetration limit. Of course it is to be appreciated that, as in the previous methods, an endpoint, or other point within the segment corresponding to the significant increase in frequency bandwidth relative to earlier segments, may be selected as the effective penetration limit. Although selecting different points within the segment will result in a different absolute value for the calculated effective penetration limit, the change in the effective penetration limit between scans will remain the same and thus provide information such as changes in the electrical properties of the ground, for example, changing ground conductivity information.

Figure 6:
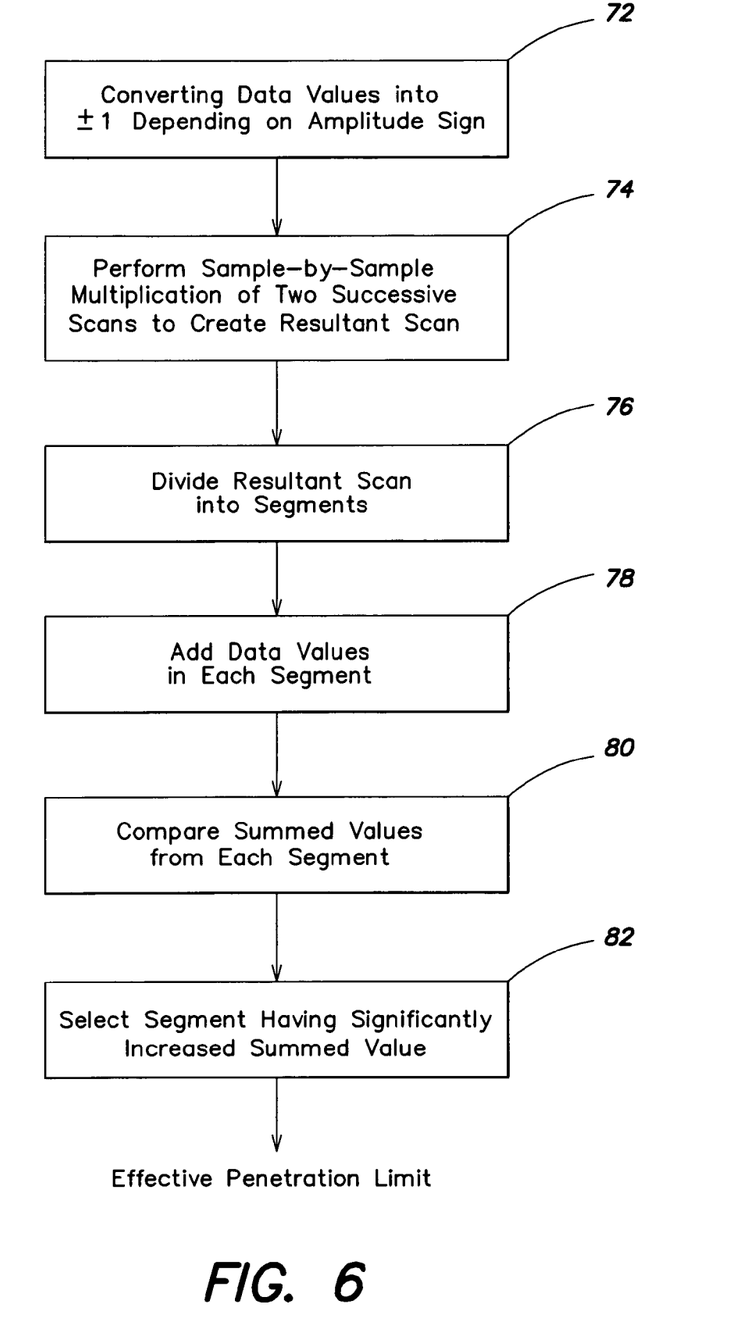
FIG. 6 is a flow diagram illustrating another embodiment of a method of effective penetration limit determination according to the invention.

Referring to FIG. 6, there is illustrated a flow diagram of yet another embodiment of an effective penetration limit determination method. The method may include a first step 72 of converting amplitude values of each data sample of a first scan and of a second scan into 1 or −1, where the resultant value corresponds to the sign of the amplitude of the original data sample. Next, the method may include performing a sample-by-sample multiplication (step 74) of the converted data samples from the first scan with the converted data samples from the second scan to provide a resultant scan. The resultant scan may then be divided into a number of segments (step 76) and the converted data sample values in each segment may be summed (step 78) to provide a summed value. The method may further include comparing the summed values from each segment (step 80) and selecting the summed value that corresponds to a significant increase relative to the summed values from segments associated with earlier scan (time) intervals (step 82) as representing the effective penetration limit of the GPR system. It is to be understood that the terms "scan interval," "time interval" and "scan time interval" are used synonomously for the purposes of this specification and refer to different segments (time intervals) in the scans of data.

According to another embodiment of the invention, any one of the effective penetration limit determination methods described above may be applied to scans of data in real time using the GPR control unit 16 (see FIG. 1), and the control unit may be configured to implement one or all of the methods described herein. Tracking the effective penetration limit in real time may permit automatic adjustment of parameters of the GPR control unit 16, for example, via a feedback loop, to optimize quality of the data collected. According to another embodiment, any or all of the methods described above may be encoded on a computer readable medium, for example, a diskette, compact disk, memory device, or other computer readable medium and may be accessed by the control unit, or by a computing device either coupled to or remote from the GPR system.

As stated above, the effective penetration limit of the GPR system may be dependent on a number of factors in addition to ground conductivity. For example, large changes in a reflectivity pattern of the ground that are not associated with ground conductivity will influence the effective penetration limit of the GPR system. The source of these changes in the reflectivity pattern may be attributed to a change in the structural composition of the ground. For example, a quartz sand will often possess a different reflectivity pattern than granite bedrock.

In a significant number of instances, however, it can be assumed that there is no significant structural change across a survey area. For these instances, a change in the effective penetration limit from one spatial location to another within the survey area may be associated with a change in ground conductivity. Sandy soils are one example of this scenario. The composition of sandy soils may be considered to be relatively homogeneous over a fairly large survey area. Sandy soils also tend to provide multiple reflecting horizons due to differential compaction and slight changes in mineralogy or grain size. However, the effective penetration limit of the GPR system in a substantially homogenous sandy soil survey area may be relatively constant despite such, possibly complicated, horizontal effects that may exist in sandy soils. Significant changes in the effective penetration limit of the GPR system from one scan to another in these soils therefore may be associated with changes in conductivity due to multiple possible sources, including, but not limited to: the ingress of road salts; moisture variation; significant mineralogic changes; or soil contamination.

It is also to be appreciated that although ambient noise and system noise may also affect the effective penetration limit of the GPR system, the ambient noise and system noise can often be considered to be invariant during a GPR survey with a ground-coupled antenna. Therefore, such noise may not cause changes in the effective penetration limit of the GPR system over the survey area. Thus, such changes can be attributed to other factors, such as changes in the ground conductivity levels, as described above.

Figure 7:
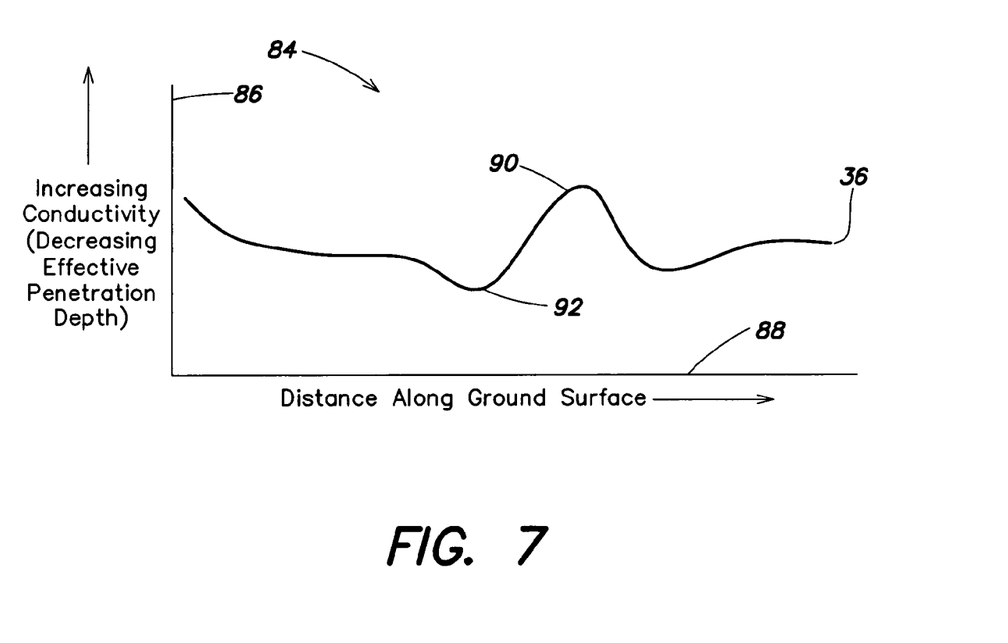
FIG. 7 is one embodiment of an effective penetration limit profile showing variations that may be associated with conductivity variations in the ground.

Referring to FIG. 7, according to one embodiment of a method according to the invention, a plurality of GPR scans along the ground surface may be collected and a graph 84 of a running average of the effective penetration limits calculated from each scan relative to the position of the scan on the ground surface, from a reference starting point, may be created. One example of such a graph 84 is illustrated in FIG. 7. The graph 84 plots the effective penetration limit calculated for each scan (on axis 86) versus distance along the ground surface (on axis 88). Decreasing effective penetration limit may correspond to an increasing ground conductivity, as shown, because increasing ground conductivity may contribute to increased signal loss. For example, a low effective penetration limit 90 may correspond to an increased conductivity in the ground at a particular location, relative to other positions along the profile (scan range) that have greater effective penetration limits 92. It is to be appreciated that although other factors apart from soil conductivity may affect signal loss, for constant frequency in a relatively homogeneous soil, it is a good assumption that increased signal loss (and thus decreased effective penetration) is indicative of increased ground conductivity.

According to another embodiment, time invariant conductivity variations, such as mineralogic changes in the soil structure, may be further isolated from conductivity variations associated with the movement of liquids and/or gases. This may be achieved by a method including steps of collecting a plurality of scans along GPR profiles traversing same locations on the ground surface, but separated by a sufficient time interval, and extracting the effective penetration limits from the scans in each traverse, for example, using the techniques described above. The method further includes subtracting the effective penetration limits of one traverse of the survey area from the effective penetration limits of the corresponding scans in another traverse. The resultant change in effective penetration depth may represent a time-dependent (temporal) change in conductivity that may be likely associated with movement of liquids and/or gases in the ground.

Figure 8:
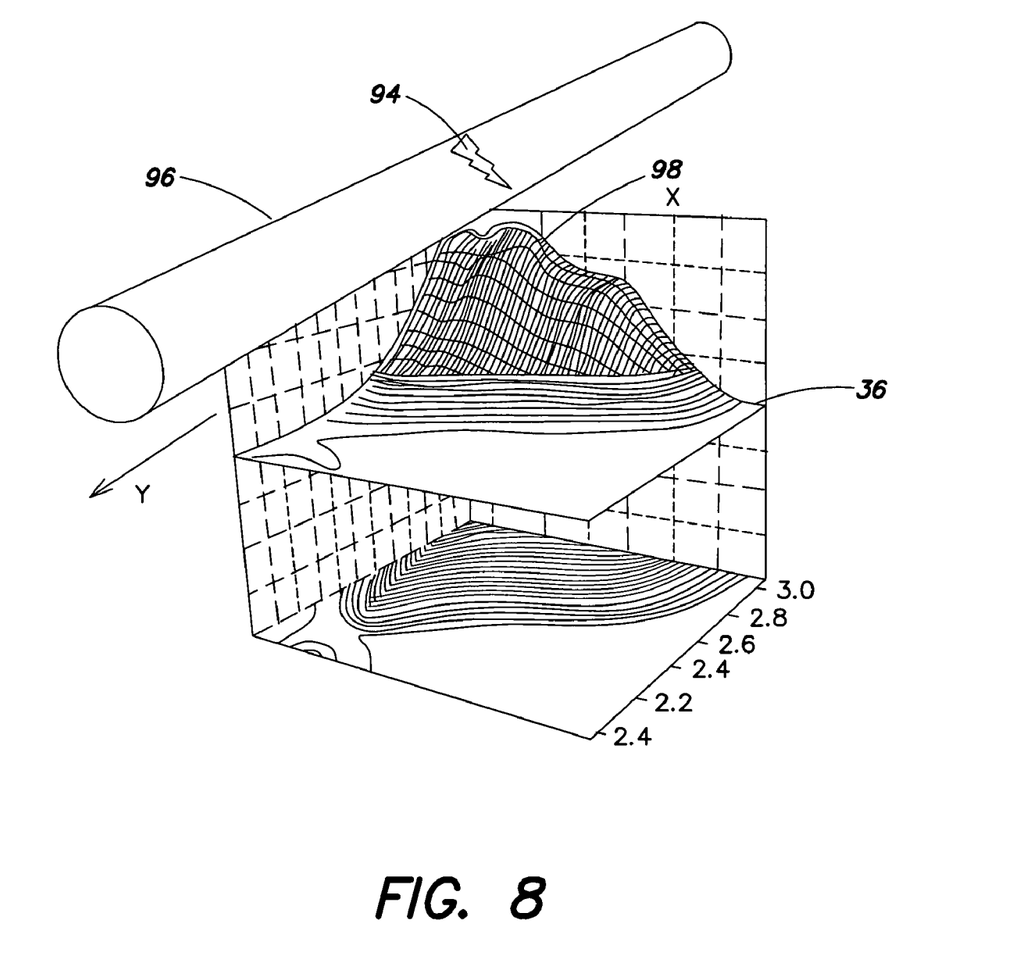
FIG. 8 is one embodiment of an effective penetration limit surface showing variations that may be associated with conductivity variations in the ground.

Referring to FIG. 8, there is illustrated an example of using effective penetration limit calculations (and thus ground conductivity information), according to any of the methods described herein, to locate leaking fluids and/or gases eminating from a break 94 in a subsurface (buried) pipeline 96. According to one embodiment of the invention, the plurality of GPR scans may be taken along the pipeline 96. The effective penetration limit calculated for each scan may be mapped versus ground position (X and Y axes relative to the pipeline 96) to create a 3-dimension image of the conductivity of the ground surrounding the pipeline 96. Significant regional changes in the effective penetration limit may indicate conductivity changes arising from a change in the fluid or gas content in the soil surrounding the pipe 58. As shown in FIG. 8, a large regional change (e.g., increase) in the ground conductivity, for example, at point 98, may indicate the position of the break 94 in the pipeline 96.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only and the scope of the invention should be determined from proper construction of the appended claims, and their equivalents.

What is claimed is:

1. A method of obtaining information about electrical properties of a medium comprising steps of:
   scanning the medium with a ground penetrating radar (GPR) system to collect at least one scan of GPR data about the medium;
   determining an effective penetration limit of the GPR system into the medium based at least in part on the GPR data collected; and
   obtaining the information about the electrical properties of the medium based at least in part on the effective penetration limit.

2. The method as claimed in claim 1, wherein the step of determining the effective penetration limit comprises steps of:
   dividing the at least one scan of GPR data into a plurality of segments, each segment corresponding to a scan time interval;
   summing a number of inflection points present in each segment to provide a plurality of summed values, one summed value corresponding to each segment;
   comparing the plurality of summed values;
   selecting one of the plurality of summed values that is significantly larger than any of the plurality of summed values corresponding to earlier scan intervals, to provide a selected summed value; and
   selecting a time point in the segment corresponding to the selected summed value as the effective penetration limit of the GPR system.

3. The method as claimed in claim 2, wherein the step of selecting the one summed value includes selecting a first one of the plurality summed values that is significantly larger than any of the plurality of summed values corresponding to earlier scan intervals, to provide the selected summed value.

4. The method as claimed in claim 2, wherein obtaining the information about the electrical properties of the medium comprises obtaining information about a conductivity of the medium and comprises steps of:
   repeating the steps of scanning the medium and determining the effective penetration limit to obtain a plurality of effective penetration limits corresponding to a plurality of scans of GPR data;
   recording a location in the medium of each of the plurality of effective penetration limits; and
   assembling the plurality of effective penetration limits and associated locations to create a profile of conductivity values of the medium.

5. The method as claimed in claim 4, wherein the step of scanning the medium is repeated at regularly spaced intervals to obtain a plurality of substantially parallel, regularly spaced, profile lines of GPR data.

6. The method as claimed in claim 5, further comprising a step of combining the plurality of profile lines of GPR data to create a conductivity contour map that represents spatial relative conductivity variations of a scanned area of the medium.

7. The method as claimed in claim 6, further comprising a step of locating a target within the medium from the spatial relative conductivity variations of the scanned area of the medium.

8. The method as claimed in claim 6, further comprising steps of:
   repeating the steps of scanning the medium at regularly spaced intervals, at a later time, to obtain a second plurality of substantially parallel, regularly spaced profile lines of GPR data.

9. The method as claimed in claim 8, further comprising a step of combining the second plurality of profile lines of GPR data to create a second conductivity contour map that represents spatial relative conductivity variations of the scanned area of the medium at the later time.

10. The method as claimed in claim 9, further comprising a step of determining temporal relative conductivity variation in the scanned area by subtracting values of the second conductivity map from corresponding values of the first conductivity map.

11. The method as claimed in claim 1, wherein the step of determining the effective penetration limit comprises steps of:
   dividing the at least one scan of GPR data into a plurality of segments, each segment corresponding to a scan time interval;

summing a number of times an amplitude of the scan data within each segment changes from a positive value to a negative value and from a negative value to a positive value, to provide a plurality of summed values, each of the plurality of summed values corresponding to one of the plurality of segments;

comparing the plurality of summed values;

selecting one of the summed values that is significantly larger than any of the summed values corresponding to segments associated with earlier scan intervals, to provide a selected summed value; and selecting as the effective penetration limit, a point in time in the segment corresponding to the selected summed value.

12. The method as claimed in claim 1, wherein the step of determining the effective penetration limit comprises steps of:

dividing the at least one scan of GPR data into a plurality of segments, each segment corresponding to a scan interval;

converting each of the plurality of segments into a corresponding plurality of blocks of frequency domain data;

determining a bandwidth of each of the plurality of blocks of frequency domain data;

selecting one of the plurality of blocks of frequency domain data that has a larger bandwidth than any of the plurality of blocks of frequency domain data corresponding to earlier scan time intervals, to provide a selected segment; and selecting as the effective penetration limit a time point within the selected segment.

13. A method of determining an effective penetration limit of a ground penetrating radar (GPR) system comprising steps of:

collecting a first scan of GPR data of a region of ground being surveyed;

collecting a second scan of GPR data of the region of ground;

converting the first scan of GPR data into a first data stream comprising a first plurality of samples;

converting the second scan of GPR data into a second data stream comprising a second plurality of samples;

multiplying the first data stream and the second data stream together, sample by sample, to create a resultant scan;

dividing the resultant scan into a plurality of segments, each segment corresponding to a time interval in each of the first and second scans;

summing a plurality of samples present in each segment of the resultant scan to provide a plurality of summed values each corresponding to one of the plurality of segments;

selecting a summed value that corresponds to a significant increase relative to the summed values from segments associated with earlier time intervals, to provide a selected summed value; and determining the effective penetration limit of the GPR system as a depth based on a chosen point in time within the segment corresponding to the selected summed value.

14. The method as claimed in claim 13, wherein each data value of the first scan of GPR data having a positive amplitude is converted into a 1 and each data value of the first scan of GPR data having a negative amplitude is converted into a −1, such that the first data stream comprises a plurality of 1's and −1's forming the plurality of samples; and wherein each data value of the second scan of GPR data having a positive amplitude is converted into a 1 and each data value of the second scan of GPR data having a negative amplitude is converted into a −1, such that the second data stream comprises a plurality of 1's and −1's forming the second plurality of samples.

15. A ground penetrating radar (GPR) system for obtaining information about electrical properties of a medium, the system comprising:

a ground penetrating radar; and a control unit configured to:

control the GPR system to scan the medium to collect at least one scan of GPR data about the medium;

determine an effective penetration limit of the GPR system into the medium based at least in part on the GPR data collected; and infer the information about the electrical properties of the medium based at least in part on the effective penetration limit.

16. The ground penetrating radar system as claimed in claim 15, wherein the control unit is further configured to determine the effective penetration limit of the GPR system by:

dividing the at least one scan of GPR data into a plurality of segments, each segment corresponding to a time interval in the at least one scan;

summing a number of inflection points present in each segment to provide a plurality of summed values, one summed value corresponding to each segment;

comparing the plurality of summed values;

selecting one of the plurality of summed values that is significantly larger than any of the plurality of summed values corresponding to earlier time intervals, to provide a selected summed value; and selecting a time point in the segment corresponding to the selected summed value as the effective penetration limit of the GPR system.

17. The ground penetrating radar system as claimed in claim 15, wherein the control unit is further configured to determine the effective penetration limit of the GPR system by:

dividing the at least one scan of GPR data into a plurality of segments, each segment corresponding to a time interval in the scan;

summing a number of times an amplitude of the scan data within each segment changes from a positive value to a negative value and from a negative value to a positive value, to provide a plurality of summed values, each of the plurality of summed values corresponding to one of the plurality of segments;

comparing the plurality of summed values;

selecting one of the summed values that is significantly larger than any of the summed values corresponding to segments associated with earlier time intervals, to provide a selected summed value; and selecting as the effective penetration limit, a point in time in the segment corresponding to the selected summed value.

18. A computer readable medium encoded with a program for execution on a processor, the program, when executed on the processor performing a method of obtaining information about electrical properties of a medium, the method comprising steps of:

scanning the medium with a ground penetrating radar (GPR) system to collect at least one scan of GPR data about the medium;

determining an effective penetration limit of the GPR system into the medium based at least in part on the GPR data collected; and obtaining the information about the electrical properties of the medium based at least in part on the effective penetration limit.

19. The computer readable medium as claimed in claim 18, wherein the step of determining the effective penetration limit comprises steps of:

dividing the at least one scan of GPR data into a plurality of segments, each segment corresponding to a scan time interval;

summing a number of inflection points present in each segment to provide a plurality of summed values, one summed value corresponding to each segment;

comparing the plurality of summed values;

selecting one of the plurality of summed values that is significantly larger than any of the plurality of summed values corresponding to earlier scan intervals, to provide a selected summed value; and selecting a time point in the segment corresponding to the selected summed value as the effective penetration limit of the GPR system.

20. The computer readable medium as claimed in claim 18, wherein the step of determining the effective penetration limit comprises steps of:

dividing the at least one scan of GPR data into a plurality of segments, each segment corresponding to a scan time interval;

summing a number of times an amplitude of the scan data within each segment changes from a positive value to a negative value and from a negative value to a positive value, to provide a plurality of summed values, each of the plurality of summed values corresponding to one of the plurality of segments;

comparing the plurality of summed values;

selecting one of the summed values that is significantly larger than any of the summed values corresponding to segments associated with earlier scan intervals, to provide a selected summed value; and selecting as the effective penetration limit, a point in time in the segment corresponding to the selected summed value.

21. The computer readable medium as claimed in claim 18, wherein the step of determining the effective penetration limit comprises steps of:

dividing the at least one scan of GPR data into a plurality of segments, each segment corresponding to a scan interval;

converting each of the plurality of segments into a corresponding plurality of blocks of frequency domain data;

determining a bandwidth of each of the plurality of blocks of frequency domain data;

selecting one of the plurality of blocks of frequency domain data that has a larger bandwidth than any of the plurality of blocks of frequency domain data corresponding to earlier scan time intervals, to provide a selected segment; and selecting as the effective penetration limit a time point within the selected segment.

* * * * *